United States Patent Office 3,836,550
Patented Sept. 17, 1974

3,836,550
CHENODEOXYCHOLIC ACID
William Arthur Jones, "Draycott," 127 Kingston Road, Staines, Middlesex, England, and Maurice Victor Burge, 11 Lascelles Close, Pilgrims Hatch, Brentwood, Essex, England
No Drawing. Continuation-in-part of application Ser. No. 223,713, Feb. 4, 1972. This application May 25, 1973, Ser. No. 363,992
Int. Cl. C07c 169/52
U.S. Cl. 260—397.1  16 Claims

ABSTRACT OF THE DISCLOSURE

The invention relates to a proces for the preparation of chenodeoxycholic acid of high purity by a process in which crude chenodeoxycholic acid is precipitated in the form of its calcium or strontium salt which is then acidified to liberate the purified acid which is then recovered.

This invention relates to the production of chenodeoxycholic acid and more particularly to a process for the purification of crude chenodeoxycholic acid and is a continuation-in-part of our application Ser. No. 223,713 filed Feb. 4, 1972.

BACKGROUND OF INVENTION

Chenodeoxycholic acid is a compound of the following formula

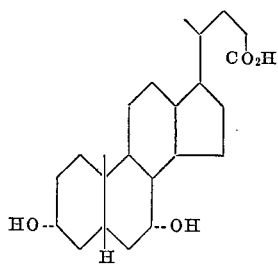

which is prepared from the cholic constituent of bile. The standard process for the preparation of chenodeoxycholic acid from the cholic acid fraction of bile is the elimination from the cholic acid of the 12-hydroxyl group by a process involving esterification, acetylation, oxidation, hydrazone formation and final elimination of nitrogen and hydrolysis of the product to produce the chenodeoxycholic acid. The reaction takes place according to the following reaction scheme.

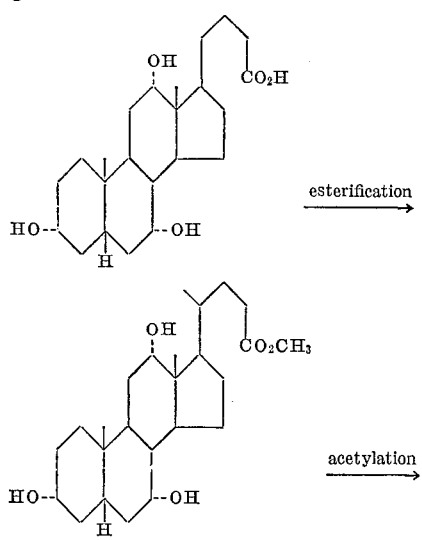

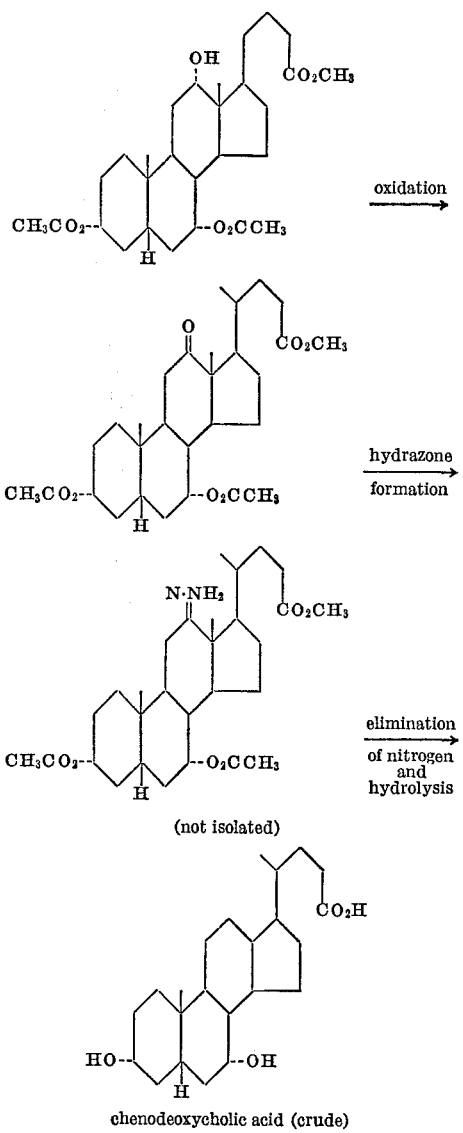

chenodeoxycholic acid (crude)

Unfortunately the chenodeoxycholic acid produced by the process outlined above is invariably extremely difficult to purify, particularly because the chenodeoxycholic acid is extremely difficult to crystallise even in highly purified form.

One particular stage of the process which results in the accumulation of considerable impurity in the product is the reduction of the 3α,7α-diacetoxy-12-ketocholanate. One method of reduction is the so-called Wolff-Kishner reduction which involves the heating of the keto-compound in a high boiling solvent, for example ethyleneglycol or triethyleneglycol in the presence of potassium hydroxide and hydrazine hydrate for several hours at approximately 200° C. The reduced product is grossly contaminated by material produced by degradation as a result of the vigorous reaction conditions. Alternatively, the reduction can be carried out by a modification of the Wolff-Kishner method (Sarel and Yanuka, J. Org. Chem., 24, 2018 (1959)) in which the 12-ketone together with hydrazine hydrate and ethylene glycol is refluxed for 1 hour at 100° C., the reaction mixture cooled to room temperature and solid potassium hydroxide added over a period of 30 minutes and the excess hydrazine hydrate and water distilled off over a period of 1 hour while the temperature is allowed to rise to 200° C. The mixture is maintained then for a further 2 hours at this temperature, to complete the reduction. Again, the product is grossly contaminated with degradation products and many re-crystallisation stages are required to obtain even a reasonable degree of purification, with the difficulty that crystallisation is not easy as far as the product is concerned.

SUMMARY OF THE INVENTION

It has now been found that crude chenodeoxycholic acid, produced by any conventional process, can be conveniently purified by treating the crude acid in methanolic solution with a calcium or strontium salt and then rendering the solution alkaline to precipitate the calcium or strontium salt of the acid. The preparation of the acid from its calcium or strontium salt is carried out by a straightforward acidification and suitable extraction.

Accordingly, the present invention provides a process for the purification of crude chenodeoxycholic acid which comprises precipitating the crystalline calcium or strontium salt of chenodeoxycholic acid from a methanolic solution of the crude acid, calcium or strontium salt, and a base selected from the group consisting of gaseous ammonia, ammonium hydroxide, an organic base and an alkali metal hydroxide, provided that when an alkali metal hydroxide is employed it is added in a stoichiometric amount prior to the addition of the source of the calcium or strontium salt; separating the precipitated salt; and treating the separated salt with an acidic reagent to separate purified chenodeoxycholic acid.

DESCRIPTION OF PREFERRED EMBODIMENTS

Examples of suitable calcium and strontium salts are calcium chloride and strontium nitrate (anhydrous) and strontium chloride hexahydrate.

It is preferred to combine either a methanolic solution of the calcium or strontium salt, for example calcium chloride with a methanolic solution of the acid and then to add the base to the combined solutions, or more conveniently, to dissolve the salt, for example calcium chloride, directly in a solution of the acid in methanol. This embodiment is preferred because of the increased rate of solution (and possibly solubility) of the salt under these conditions.

The base which is used to render the salt/crude acid solution alkaline may be ammonium hydroxide or gaseous ammonia or an organic, preferably a nitrogenous base. Organic bases having a $pK_a$, in aqueous solution, of at least 6.6 are preferred. Alkali metal hydroxides cannot generally be used because of the consequential precipitation of calcium or strontium hydroxide from the salt/crude acid solution. However, alkali metal hydroxides can be used if added only in stoichiometrically equivalent quantity to the methanolic solution of the crude acid before the addition of the calcium or strontium salt.

Among the nitrogenous bases which can be used are methylamine, ethylamine, sec-butylamine, tri-n-butylamine, diethylamine, triethylamine, ethanolamine 1,2-diamino-ethane, cyclohexylamine, tetramethyl ammonium hydroxide, hydrazine hydrate, piperidine, piperazine, pyrrolidine, benzylamine and morpholine. Weak bases such as pyridine, quinoline or aniline generally do not effect satisfactory precipitation. Hexamine (hexamethylenetetramine), N,N-diethylaniline, 2-amino-pyridine, 1-methylimidazoline, 2,4-lutidine and symcollidine are effective though giving reduced yields of acid salt.

Another and quite separate possibility for improving the purity of the final product concerns modifications to the acetylation stage in the process for producing the chenodeoxycholic acid. These involve the choice of reaction solvent and the period and temperature conditions of the reaction. Using dioxan as the solvent, reaction (as measured by T.L.C. data) is almost complete after only 30 minutes at 95° C. the product being predominantly the required diacetoxy compound with only traces of mono- and tri-substituted components. After 2 hours at this temperature the reaction is complete but the product is an oil which is difficult to purify. Reaction in tetrahydrofuran at 50° C. for 4 hours gives complete diacetylation with only traces of mono- and tri-acetylated compounds. The most attractive solvent is acetonitrile since reaction at 50° C. for 2 hours gives acceptable material in very good yield. The major advantage is that the product crystallizes from the reaction mixture simply on dilution with water and the first crop material so produced was successfully taken through to the keto-stage without further purification. The acetylation was also carried out successfully in dimethylsulphoxide at 20° for 22 hours but without particular advantage.

A further possibility for separately improving the purity of the final product exists in a modification of the process for producing the crude acid which avoids the somewhat vigorous reaction conditions required in the formation of the hydrazone by either the Wolff-Kishner reduction or the Sarel and Yanuka modification of the Wolff-Kishner reduction. It has been found that the 12-keto compound can be reduced without the necessity to form a hydrazone with the attendant vigorous reaction conditions by conducting the reduction by cathodic means. However, even using this more gentle reduction method, it was found that the final product was still heavily contaminated with impurities. However, the use of cathodic reduction method coupled with the purification process of this invention results in the possibility of obtaining an even purer product.

In the purification process according to the invention the volume of methanol used to dissolve the calcium or strontium salt and the crude acid may be critical and depends upon the method by which the crude acid was originally prepared. Thus, for example, where the $3\alpha,7\alpha$-diacetoxy-12-ketocholanate has been prepared by the unmodified Wolff-Kishner reduction and where a calcium salt is being used, the quantity of methanol required to produce the optimum purification is from 35 to 40 ml./g. crude acid. In the case of strontium salts the volume of methanol is reduced by one-half, i.e. to a maximum of 20 ml./g. to give corresponding yields and can be reduced to 10 ml./g. crude acid. Below this figure the addition of aqueous ammonium hydroxide tends to throw out the bile acid together with impurities by a simple dilution effect. The use of ammonia gas or other anhydrous nitrogenous base, dissolved in methanol avoids this effect, and in this case as little as 5 ml./g. crude acid of methanol can be used. Larger volumes of methanol give very pure product but in lower yields.

It has been found in many instances, using the purification process of the present invention that the time taken for the appearance of the crystalline salt of the acid may be a useful criterion of the quality of the crude acid, when considered in relation to a fixed volume of methanol, this is particularly so when calcium chloride is used as the calcium salt. In general, with constant batches of material, the greater the volume of methanol the longer the delay, for example 30 to 60 seconds and approximately 4 hours are the lengths of time required for the process using on the one hand 35 to 40 ml. and on the other hand 125 ml. methanol/g. acid respectively.

The product of the invention, chenodeoxycholic acid, is used in the dissolution of gall stones as therapy for the treatment of cholelithiasis. The improved purity of the product of this invention provides obvious advantages for its use as a therapeutic agent.

The following is an account of a substantially conventional process for the production of crude chenodeoxycholic acid which product can be then purified by the process of the invention. Thin layer chromatography (T.L.C.) is carried out on layers (0.25 mm. thick) of silica gel G, activated by heating at 105° C. for 30 minutes. Test substances are loaded as 1% solutions (10 μl.) in acetone. Significant esterification occurs on standing in methanolic solution. Calcium/strontium salt preparations are suspended in acetone and dissolved by the addition of 1 drop of glacial acetic acid. These solutions should be freshly prepared since partial acetylation occurs on standing giving a substance which appears in the same position as lithocholic acid, i.e. $R_x 1.7$ (CDCA=1.0). The plates are run in the solvent system: trimethylpentane-ethyl acetate-acetic acid (5:5:1). After being dried at 105° C. for 10 minutes the plates are sprayed whilst still warm with either (a) 10% phosphomolybolic acid in ethanol or (b) 5% phosphomolybolic acid in glacial acetic acid-concentrated sulphuric acid mixture (19:1) (Usui's reagent, J. Biochem. Tokyo, 1963, 54, 283–6). For full colour development the plates are heated for a further 5 minutes at 105°. Neither of these reagents develops a satisfactory colour with the 12-keto-compound and in this case it is necessary to pre-treat the developed plate with a methanolic solution of sodium borohydride, as described by Usui.

Cholic acid (500 g.) with a low deoxycholic acid content was suspended in methanol (1,500 ml.) in an r.b. flask. The flask was carefully warmed on a steam bath and concentrated sulphuric acid (21.5 ml.) added dropwise over a period of 30 minutes to the stirred suspension by which time all the cholic acid had dissolved.

The clear solution was heated under reflux with stirring for 20 minutes to complete the esterification then cooled rapidly with continued stirring to produce small crystals. The suspension was cooled overnight in a refrigerator (0–5° C.), the crystals filtered off and washed with ice-cold methanol (200 ml.) to remove the bulk of the mineral acid. The crystals of methyl cholate were recrystallised from methanol before going on to the next stage.

Methyl cholate (400 g.) was dissolved at room temperature in benzene (1,920 ml.) pyridine (480 ml.) and acetic anhydride (480 ml.). The solution was allowed to stand at room temperature for 24 hours then poured into, and shaken with, a large excess of water (total volume approximately 8 litres). The benzene layer was separated and repeatedly washed with water (2,000 ml. ×4) to remove excess pyridine. The aqueous layers were discarded.

The benzene solution was dried overnight with sodium sulphate and then evaporated to dryness. The solid residue was taken up in methanol (approximately 1,200 ml.) and crystallised from 700 ml. of this solvent.

The "chunky" crystalline solid was filtered and washed with ice-cold methanol (100 ml.) and then dried in a vacuum oven at 100° C. for 10 hours. Yield 355 g. (74%); m.p. 178–182° C. T.L.C. (using Usui's reagent) on the above compound showed predominantly the 3α,7α-diacetoxy-12α-hydroxy-cholanate with three trace impurities.

Recrystallisation from methanol failed to improve the purity of the compound as ascertained by T.L.C., but raised the melting point (m.p.) to 182–185° C.

Methyl 3α,7α-diacetoxy-12α-hydroxycholenate (300 g.; m.p. 178–182° C.; T.L.C. as previously described) was dissolved in glacial acetic acid (1,800 ml.) with mechanical stirring.

This solution was oxidised by the slow dropwise addition over a period of one hour of a solution of sodium chromate (analytical quality, anhydrous, reagent 162 g.) in water (240 ml.). A deep red solution resulted and the temperature during the addition was kept between 20° C. and 35° C. without using an external cooling bath.

The reaction was left to stand at room temperature overnight and re-stirred for a further 30 minutes in the morning. Water (1,800 ml.) was then added dropwise so as to precipitate a granular product. This was filtered off and washed until colourless with distilled water (approximately 3,000 ml.). The white granular 3α,7α-diacetoxy-12-ketocholanate was dried in a vacuum oven at 100° C. for 10 hours.

Yield 260 g. (87%); m.p. 181–183° C., T.L.C. (Usui's spray reagent) showed predominantly the 12-ketone, with one major and two minor impurities. Crystallisation from methanol (×2) improved the T.L.C. of the 12-ketone; only one trace impurity was observed, and the m.p. was raised to 182–184° C.

A mixture of the 3α,7α-diacetoxy 12-ketocholanate (5 g.; crystallised (×2) from methanol), hydrazine hydrate (99–100%; 20 ml.) and ethylene glycol (not less than 95% boiling between 194° and 199° C.; 30 ml.) was refluxed for 2 hours at 140° C. (liquid temperature). A 40% solution of potassium hydroxide (10 g. in 225 ml. water) was then added to this hot clear reaction mixture and excess hydrazine hydrate and water distilled off during one hour, whilst the liquid temperature rose to 200° C. This temperature was held for a further 2 hours to complete the reduction.

The reaction mixture was allowed to cool to room temperature overnight and then diluted with water (approximately 200 ml.). 2N-hydrochloric acid was added dropwise to the mechanically stirred solution to pH 1 (ascertained by indicator paper), giving a white precipitate. Approximately 110 ml. of acid were required.

The crude chenodeoxycholic acid was filtered off, washed free of acid with water (approximately 2,000 ml.) and dried in a vacuum oven at 60° C. for 10 hours to a "crispy" non-crystalline solid; 3.8 g. (theoretical weight 3.9 g.). It is important that all the mineral acid should be washed out at this stage otherwise extensive degradation of the chenodeoxycholic acid results during the drying process. To make certain that all the acid is removed, the precipitated acid can be re-slurried with water, adjusted to pH 5 to 6 with ammonium hydroxide and re-filtered prior to being dried.

The purification process of the present invention is illustrated by the following examples.

EXAMPLE 1

Crude chenodeoxycholic acid (3 g.) was dissolved at room temperature in methanol (120 ml.) and filtered to remove all suspended material. Calcium chloride dihydrate (Analar; 0.57 g.) was dissolved at room temperature in this solution. On addition of ammonium hydroxide solution (sp. gr. 0.910, 0.8 ml.) to pH 7.5 (ascertained by moistened indicator paper), a white crystalline precipitate of calcium salt was observed within a period of 10 seconds to 2 minutes. This was allowed to settle out overnight at room temperature, filtered, washed with methanol (40 ml.) and dried in a vacuum oven at 100° C. for 10 hours; yield 2.3 g.; T.L.C. (spray reagent: 10% phosphomolybdic acid in ethanol) showed "one spot" material. The calcium salt (2.3 g.) was acidified with 2N-hydrochloric acid (50 ml.) and extracted with ethyl acetate (50 ml.). The ethyl acetate extract was washed with water (50 ml. ×5), dried over magnesium sulphate, filtered and the pure chenodeoxycholic acid precipitated by the slow addition of petroleum ether (80–100° C.; 150 ml.). The solid was filtered and dried in a vacuum oven at 60° C. for 10 hours; 1.75 g. (58% recovery). T.L.C. (spray reagent: 10% phosphomolybdic acid in ethanol) showed "one spot" chenodeoxycholic acid.

EXAMPLE 2

2.36 kg. of crude chenodeoxycholic acid prepared as described above subjected to preliminary purification by extraction with water and drying was dissolved in methanol (95 litres) with stirring. A quantity (ca. 8 litres) of the solution was removed and calcium chloride dihydrate (A.R. grade, 450 g.) dissolved in it with mechanical stirring and the solution then returned to the main batch. Concentrated ammonia solution (sp. gr. 0.880, 285 ml.) was added in one portion to the stirred solution. Crystallisation of the calcium salt commenced within one minute, and within fifteen minutes the mixtures had set to a pasty mass. Immediately prior to crystallisation the reaction, as measured by moistened indicator paper, was pH 10 but after fifteen minutes this had fallen to *ca.* pH 6.

After the mixture had been allowed to stand overnight at ambient temperature the calcium salt was removed by vacuum filtration and the filter cake washed with methanol (5 litres). The product was dried overnight at 105° C. in a hot-air oven, giving the calcium salt (1.78 kg., 75.3% of crude material) as a lumpy white powder.

For regeneration of the purified acid the salt was dissolved with stirring during one hour in a mixture of dilute hydrochloric acid (2N, 24 litres) and ethyl acetate (20 litres). After separation of the phases, the aqueous layer was re-extracted with ethyl acetate (5 litres) and then discarded. The combined organic phases where washed successively with water (1× 7 litres) brine (2× 5 litres) and water (2× 5 litres). The final wash had a reaction of pH 5. The ethyl acetate solution was transferred to a still and washed in with fresh solvent (5 litres) giving a total volume of *ca.* 25 litres from which the water was removed azeotropically using the Dean and Stark principle. A total of 1.5 litres of water saturated with ethyl acetate was removed during 6 hours distillation.

Petroleum ether (b. 80–100° C.) was added slowly to a stirred aliquot (100 ml.) of the dried solution. After the addition of 75 ml. a permanent slight turbidity was obtained and within 1–2 minutes a quantity of CDCA separated in its characteristics "structured-gel" form. Precipitation increased on further addition of petroleum ether; a total of 200 ml. was added without changing the form of the precipitated acid.

The bulk of the dried solution was cooled to *ca.* 30° C. by gentle evaporation under vacuum then transferred to a 100 litre vessel and washed in with ethyl acetate (5 litres) giving a total volume of *ca.* 24 litres. To this stirred solution was added petroleum ether until a slight turbidity was obtained. The pilot precipitation mixture was then returned to the main batch and stirring continued without further addition until precipitation of the acid commenced (5–10 minutes). Addition of petroleum ether was then continued with stirring until a total of 48 litres had been added. The mixture was stirred for a further 1.5 hours and the solid then removed by vacuum filtration. After being washed with ethyl acetate-petroleum ether mixture (1:2, 3 litres) the moist cake containing much solvent was transferred to enamelled trays and oven-dried at 50° C. for 90 hours. Analysis by GLC at this stage showed that the product (by this time a lumpy white powder) contained 0.8% ethyl acetate and 3% petroleum ether. The product was redried at 65° C. *in vacuo* for 24 hours, when GLC analysis showed less than 0.1% ethyl acetate and 0.6% petroleum ether. Drying was continued under these conditions for a further 48 hours, by which time the petroleum ether content was less than 0.1% and ethyl acetate was not detectable.

As stated previously strontium salts can also be used, particularly strontium nitrate and strontium chloride.

The purification process of the invention using strontium salts is basically the same as that used with calcium salts. However, using strontium the chenodeoxycholic acid salt product tends to be more microscopically crystalline than in the case where calcium salts are used, while the yield of the acid salt (calculated on the basis of Wolff-Kishner products) is some 10% less for the strontium salts than for the calcium salts. Typically, yields for the former are of the order of 78 to 88% by weight, while the yields of dried acid regenerated from the calcium salt are usually between 85 and 88% by weight.

What is claimed is:

1. A process for the purification of crude chenodeoxycholic acid which comprises precipitating the crystalline calcium or strontium salt of chenodeoxycholic acid from a methanolic solution of the crude acid by admixing said methanolic solution with a calcium or strontium salt and a base selected from the group consisting of gaseous ammonia, ammonium hydroxide, an organic base and an alkali metal hydroxide, provide that when an alkali metal hydroxide is employed it is added to said methanolic solution in a stoichiometric amount prior to the addition to said methanolic solution of the source of the calcium or strontium salt; separating the precipitated salt; acidifying the separated salt; and recovering purified chenodeoxycholic acid.

2. A proces as claimed in claim 1 wherein the calcium or strontium salt is calcium chloride, strontium nitrate or strontium chloride.

3. A process as claimed in claim 1 wherein the base is an organic base having a $pK_a$, in aqueous solution, of at least 6.6.

4. A process as claimed in claim 1 wherein a methanolic solution of the calcium or strontium salt is combined with a methanolic solution of the crude acid and the base is then added to the combined solutions.

5. A process as claimed in claim 1 wherein the calcium or strontium salt is dissolved directly in a solution of the crude acid in methanol before addition of the base.

6. A process as claimed in claim 3 wherein the base is methylamine, ethylamine, sec-butylamine, tri-n-butylamine, diethylamine, triethylamine, ethanolamine, hexamethylenetetramine, 1,2-diaminoethane, cyclohexyamine tetramethyl ammonium hydroxide, hydrazine hydrate, piperidine, piperazine, pyrrolidine, benzylamine or morpholine.

7. A process as claimed in claim 1 wherein the base is an alkali metal hydroxide and is added in a stoichiometrically equivalent quantity to the methanolic solution of crude acid prior to the addition of the calcium or strontium salt.

8. A process as claimed in claim 1 in which the crude chenodeoxycholic acid, calcium chloride and from 35 to 40 ml. of methanol per gram of crude acid are combined and rendered alkaline by the addition of ammonium hydroxide, the crystalline calcium salt of the acid separated and acidified and the purified acid extracted and recovered.

9. A process as claimed in claim 1 wherein the crude acid, anhydrous strontium nitrate or strontium chloride hexahydrate, and from 10 to 20 ml. of methanol per gram of crude acid are combined, the mixture is rendered alkaline with anhydrous ammonia gas or ammonium hydroxide, the crystalline strontium salt of the acid is separated and acidified, and the purified acid is recovered by extraction.

10. A process as claimed in claim 1 wherein the crude acid, anhydrous strontium nitrate or strontium chloride, hexahydrate and from 5 to 10 ml. of methanol per gram of crude acid are combined and the mixture is rendered alkaline with anhydrous ammonia gas or other anhydrous organic base, the crystalline stronium salt of the acid is separated and acidfied and the purified acid is recovered by extraction.

11. In a process for the preparation of purified chenodeoxycholic acid which comprises the steps of subjecting cholic acid to esterification of the carboxy group, acetylating the hydroxy groups in the 3- and 7-positions of the cholic acid ester, oxidizing the hydroxy group in the 12-position of the acetylated ester to form the 12-keto derivative, subjecting the 12-keto derivative to reduction under conditions to convert the 12-keto group into a 12-hydrazone group, subjecting the hydrazone in situ to nitrogen elimination and hydroylsis to form chenodeoxycholic acid; and separating the crude chenodeoxycholic acid so produced, the improvement which comprises admixing the crude chenodeoxycholic acid with methanol to form a methanolic solution of the crude acid, admixing said methanolic solution with a calcium or strontium salt and a base selected from the group consisting of gaseous ammonia, ammonium hydroxide, an organic base and an alkali metal hydroxide to precipitate the crystalline calcium or strontium salt of chenodeoxycholic acid, provided that when an alkali metal hydroxide is employed it is added to the methanolic solution in a stoichiometric amount prior to the addition to the methanolic solution of the calcium or strontium salt; separating the precipitated salt; acidfying the separated salt and recovering the purified chenodeoxycholic acid so obtained.

12 A process as claimed in claim 11 wherein the ester is acetylated by reaction in acetonitrile at 50° C. for two hours.

13. A process as claimed in claim 11 wherein the ketone is reduced by cathodic reduction.

14. A process as claimed in claim 11 wherein the base is an organic base having a $pK_a$ in aqueous solution, of at least 6.6.

15. A process as claimed in claim 11 wherein the base is an alkali metal hydroxide and is added in stoichiometrically equivalent quantity to the methanolic solution of crude acid prior to addition of the calcium or strontium salt.

16. A process as claimed in claim 1, wherein the separated salt is acidified with a mineral acid.

References Cited
UNITED STATES PATENTS 3,164,616  1/1965  Bharucha _____ 260—397.1

OTHER REFERENCES

Hausser et al.: "Helv. Chim. Acta," vol. 43 (1960), pp. 1595–1600 relied on.

ELBERT L. ROBERTS, Primary Examiner

UNITED STATES PATENT OFFICE
CERTIFICATE OF CORRECTION

Patent No. 3,836,550          Dated September 17, 1974

Inventor(s) WILLIAM ARTHUR JONES ET AL

It is certified that error appears in the above-identified patent and that said Letters Patent are hereby corrected as shown below:

In the heading of the patent, add the following:

-- Claims priority from U.K. Patent Application 2803/72, filed January 20, 1972 and from the filing of the complete specification of this British Application on January 15, 1973. --

Signed and sealed this 10th day of June 1975.

(SEAL)
Attest:

RUTH C. MASON
Attesting Officer

C. MARSHALL DANN
Commissioner of Patents
and Trademarks